(12) United States Patent
Varkony et al.

(10) Patent No.: US 12,548,607 B2
(45) Date of Patent: Feb. 10, 2026

(54) DYNAMIC CONTROL OF DATA TRANSIENT RISE TIME BASED ON PROCESS, TEMPERATURE, VOLTAGE (PVT) DATA IN A MEMORY DEVICE

(71) Applicant: Infineon Technologies LLC, San Jose, CA (US)

(72) Inventors: Ron Varkony, Netanya (IL); Yoram Betser, Mazkeret-Batya (IL)

(73) Assignee: Infineon Technologies LLC, San Jose, CA (US)

( * ) Notice: Subject to any disclaimer, the term of this patent is extended or adjusted under 35 U.S.C. 154(b) by 106 days.

(21) Appl. No.: 18/653,596

(22) Filed: May 2, 2024

(65) Prior Publication Data

US 2025/0342868 A1 Nov. 6, 2025

(51) Int. Cl.
*G11C 7/10* (2006.01)
*G06F 3/06* (2006.01)

(52) U.S. Cl.
CPC ............ *G11C 7/1048* (2013.01); *G06F 3/061* (2013.01); *G06F 3/0656* (2013.01); *G06F 3/0679* (2013.01); *G11C 2207/2254* (2013.01)

(58) Field of Classification Search
CPC .......... G11C 7/1048; G11C 2207/2254; G06F 3/061; G06F 3/0656; G06F 3/0679
USPC ........................................ 365/189.18, 189.05
See application file for complete search history.

(56) References Cited

U.S. PATENT DOCUMENTS

| | | | | |
|---|---|---|---|---|
| 5,311,084 | A * | 5/1994 | Gabara | H03K 19/00361 327/170 |
| 6,011,409 | A * | 1/2000 | Huang | H03K 19/00315 326/119 |
| 6,535,020 | B1 * | 3/2003 | Yin | H03K 19/00384 326/26 |
| 6,714,048 | B1 * | 3/2004 | Sharpe-Geisler | H03K 19/018585 326/62 |
| 6,882,188 | B1 * | 4/2005 | Chen | H03K 19/00315 327/170 |
| 6,985,014 | B2 * | 1/2006 | Ajit | H03K 19/00384 326/82 |
| 7,986,171 | B2 * | 7/2011 | Wang | H03K 19/0013 327/108 |
| 9,042,175 | B2 * | 5/2015 | Sim | G11C 7/04 365/185.11 |
| 2005/0017754 | A1 * | 1/2005 | Ker | H03K 17/102 326/81 |
| 2007/0018684 | A1 * | 1/2007 | Pan | H03K 19/00384 326/32 |
| 2008/0303545 | A1 * | 12/2008 | Chow | H03K 3/356139 326/26 |

(Continued)

*Primary Examiner* — Michael T Tran

(57) ABSTRACT

A memory device includes an array of memory cells of non-volatile memory and an input/output (IO) buffer coupled to the array. The IO buffer comprises a primary pullup transistor coupled between a power supply and ground and coupled to a data quick (DQ) output line. The IO buffer includes selectable pullup transistors coupled in parallel with the primary pullup transistor. The IO buffer includes logic coupled to the selectable pullup transistors. The logic selects a customized number of the selectable pullup transistors, based on process, voltage, temperature (PVT) data associated with the memory device, for use during a transient period of data transmission at the DQ output line.

25 Claims, 10 Drawing Sheets

(56) References Cited

U.S. PATENT DOCUMENTS

| | | | |
|---|---|---|---|
| 2014/0097888 A1* | 4/2014 | Lee | H03K 19/018521 |
| | | | 327/537 |
| 2014/0269089 A1* | 9/2014 | Shimizu | G11C 5/063 |
| | | | 365/185.18 |
| 2019/0080745 A1* | 3/2019 | Kim | G11C 7/1057 |
| 2020/0191862 A1* | 6/2020 | Abhishek | G01R 31/2853 |
| 2021/0281066 A1* | 9/2021 | Lee | H10D 89/811 |

\* cited by examiner

DYNAMIC CONTROL OF DATA TRANSIENT RISE TIME BASED ON PROCESS, TEMPERATURE, VOLTAGE (PVT) DATA IN A MEMORY DEVICE

TECHNICAL FIELD

The disclosure relates to the field of memory devices, and in particular, to dynamic control of a data transient rise time based on process, temperature, and voltage (PVT) data in a memory device.

BACKGROUND

In some memory devices such as low power double data rate (LPDDR) memory devices, low-voltage, swing-terminated logic (LVSTL)-based protocols determine an output from an input/output (IO) buffer using pullup transistor(s), which are calibrated based on training that employs values read from an external ZQ (e.g., impedance/quality factor) resistor. The approach, however, has been to decide whether to add a fixed number of additional pullup transistors to a primary transistor in order to improve rise time to meet a particular output high voltage (VOH) level. Adding a fixed number of pullup transistors, however, is insufficient based on varying process, temperature, voltage (PVT) values experienced on the memory device, which impact the rise time of a data quick (DQ) output of the IO buffer.

BRIEF DESCRIPTION OF THE DRAWINGS

The disclosure is illustrated by way of example, and not of limitation, in the figures of the accompanying drawings.

DETAILED DESCRIPTION

Figure 1:
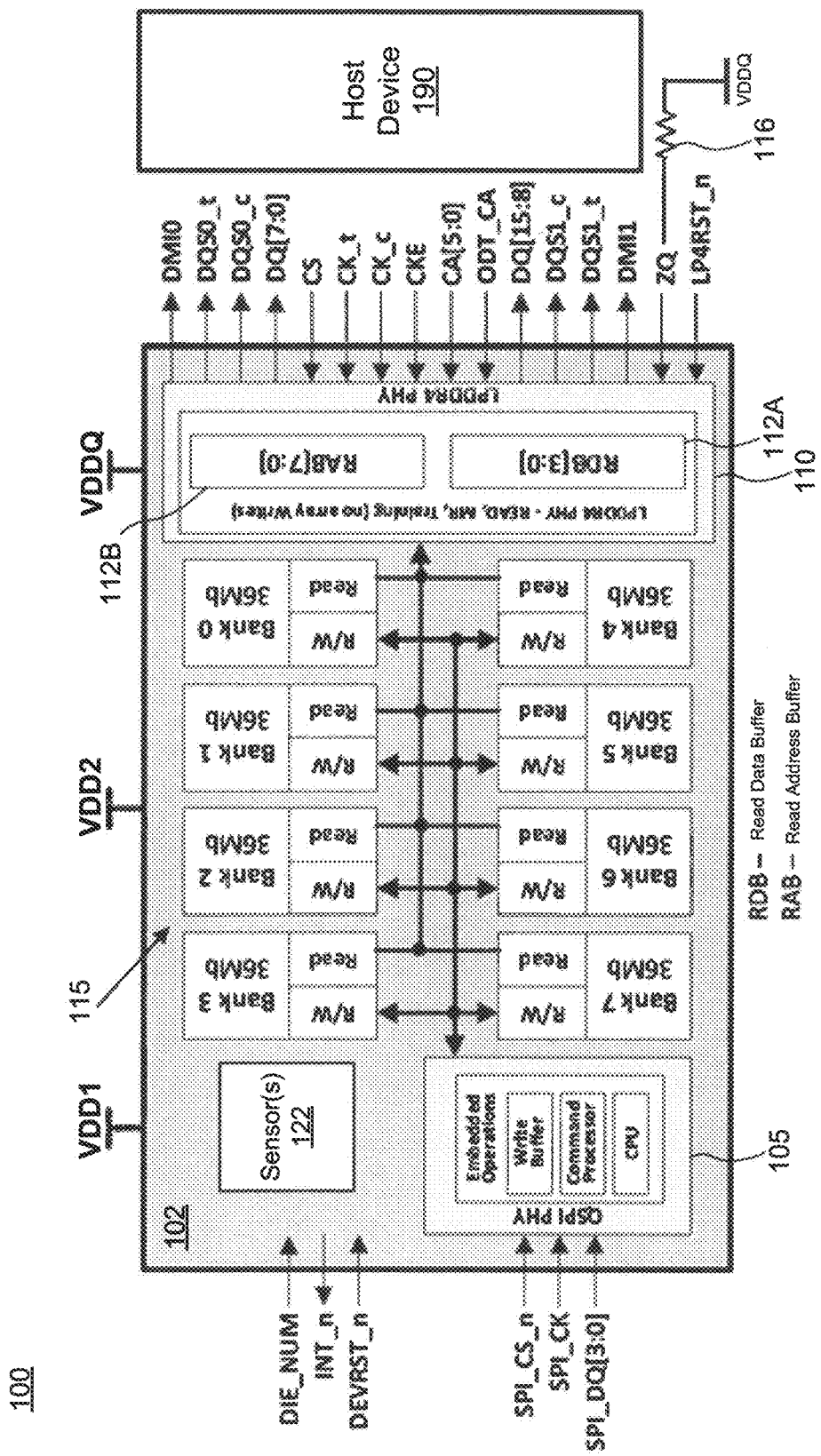
FIG. 1 is a block diagram of a system that includes a host device and a memory device having an IO buffer according to various embodiments.

As discussed, adding a fixed number of pullup transistors to the primary pullup transistor is insufficient based on varying PVT values experienced on the memory device, which impact the rise time of a data quick (DQ) output of the IO buffer. For example, for a fast data transient, the VOH level may be reached using only a few pullup transistors while for a slow data transient, the VOH level may be reached with a larger number of pullup transistors. Thus, deciding whether to add a fixed number of transistors may enable an improvement to either the fast data transient or the slow data transient cases, but not both.

With more particularity, the reason for the difference between the direct current (DC) behavior and the alternating current (AC) behavior in the DQ output of the IO buffer is a different overdrive level of the pullup transistors based on VOH-based training. That training may be based on PVT-values such as obtained during ZQ calibration, which will be discussed in more detail. For example, when the Vgs and Vds levels are small (e.g., Vgs equal to Vdd-VOH and Vds equal to Vddq-VOH), the additional pullup transistors benefit the fast data transient cases (e.g., overdrive is small). In contrast, when the overdrive is larger (e.g., Vgs=Vdd and Vds=Vddq), the additional pullup transistors benefit the slow data transient cases. Thus, during an acceleration pulse for the data transient period, adding a small number of pullup transistors may not be sufficient for the slow data transient cases while adding a large number of pullup transistor may cause overshoot and ringing for the fast data transient cases. For this reason, adding (or not) a fixed static size of pullup transistor(s) is insufficient due to changing PVT conditions of the memory device.

The present disclosure addresses the above deficiencies (and other deficiencies that will be discussed below in more detail) by dynamically customizing a size of the pullup transistor(s) within an IO buffer based on values of the most-recently-calculated PVT values. For example, the customized size of the total number of pullup transistors should be large enough to compensate for slow data transient cases while not causing overshoot in a fast data transient cases.

In some embodiments, a memory device includes an array of memory cells, a set of memory registers to store PVT data associated with the memory device, and an input/output (IO) buffer coupled to the array and the set of memory registers. In such embodiments, the IO buffer includes a primary pullup transistor coupled between a power supply and ground and coupled to a data quick (DQ) output line. The IO buffer may further include a plurality of selectable pullup transistors coupled in parallel with the primary pullup transistor. The IO buffer may further include logic coupled to the plurality of selectable pullup transistors, the logic to select a customized number of the plurality of selectable pullup transistors, based on the PVT data, for use during a transient period of data transmission at the DQ output line.

In other embodiments, the IO buffer of the memory device instead includes a bank of pullup transistors coupled between a power supply and ground and coupled to a data quick (DQ) output line, and a threshold voltage of the bank of pullup transistors is instead dynamically varied through a bulk voltage bias. For example, the IO buffer may include a voltage regulator to generate a bias voltage. The IO buffer may further include logic coupled to the bank of pullup transistors and the voltage regulator. The logic may be configured to selectively apply the bias voltage to a substrate of the bank of pullup transistors, based on the PVT data, for use during the transient period of data transmission at the DQ output line.

Therefore, advantages of the systems and methods implemented in accordance with some embodiments of the present disclosure include, but are not limited to, enabling an IO buffer of a non-volatile memory device (such as a LPDDR NOR flash memory) to customize an effective size of a bank of transistors according to the most-current PVT value(s) such as a most-recently-measured ZQ value, which can be associated with different process corners. Use of these ZQ values makes possible a more precise VOH-level calibration of the IO buffer and an ability to compensate for different speeds of data transient in DQ output lines. The improved level of calibration enables a more-defined eye diagram at the DQ output line, leading to more accurate sampling of the data from the eye diagram. The calibrated values that will be discussed can also be stored in local memory registers and may be updated during simulation or characterization periods to update an effective size of the pullup transistors, e.g., based on changing PVT conditions. These and additional advantages will be apparent to one of ordinary skill in the art in view of the following description.

FIG. 1 is a block diagram of a system 100 that includes a host device 190 and a memory device 102 having an IO buffer 110 according to various embodiments. In some embodiments, the memory device 102 is a type of LPDDR device, but could be any kind of non-volatile memory. In particular, the memory device 102 may include, but not be limited to, a serial peripheral interface (SPI) physical layer (PHY) 105 to interface with SPI-based devices, multiple memory banks 115 (any portion of which may be referred to an array of memory cells herein), an IO buffer 110 that interfaces with the host device 190, and multiple on-board sensors 122. In some embodiments, the SPI PHY 105 is an interface over which to perform non-volatile memory functions, such as reading and writing the Serial Presence Detect (SPD) EEPROM, firmware updates, or accessing other control and configuration settings that may or may not be directly related to the core memory read operations performed via the IO buffer 110 primary memory interface.

In some embodiments, the on-board sensors 122 include temperature detectors, voltage detectors, and/or ring oscillators that can provide at least some aspects of the PVT data if not obtained through ZQ calibration. In some embodiments, the host device 190 is a controller that functions on behalf of a host system that interacts with the memory device 102. For example, the host device may be operatively coupled to the memory device and configured to store data to and retrieve data from the array of memory cells.

In some embodiments, the IO buffer 110 is an LPDDR-based interface (e.g., PHY component) configured to supply data to the host device 190 read out of the multiple memory banks 115. In another embodiment, IO buffer 110 may also supply data, received from the host device 190, to be written to the multiple memory banks 115 (not shown in FIG. 1). In embodiments, the IO buffer 110 includes a read data buffer (RDB) 112A and a read address buffer (RAB) 112B. Circuitry and logic of the IO buffer 110 that will be referenced herein may be understood to variably exchange data with either or both of the RDB 112A and the RAB 112B.

In various embodiments, the IO buffer 110 includes interface pins (or pads) that are coupled to lines going to the host device 190, including 16 DQs, eight on each side of the IO buffer 110, DQS lines carrying data strobes, and other data lines. Further, the IO buffer 110 includes or is coupled to a ZQ pin that is coupled to a ZQ resistor 116 located external to the memory device 102.

In some embodiments, functionality of the data strobes of the memory device 102 may be trained to sample as close as possible to a center (or widest point) of a data eye of data being transmitted over a DQ output line. By way of example only, the LPDDR4-based interface can use an unmatched DQS-DQ path to enable high-speed performance and save power in the memory device 102. As a result, the DQS strobe can be trained to arrive at the DQ latch center-aligned with the data eye. The SDRAM DQ receiver may be located at the DQ pad and have a shorter internal delay in the memory device 102 than does the DQS signal. The DQ receiver can latch the data present on the DQ bus when DQS reaches the latch, and training is accomplished by delaying the DQ signals relative to DQS such that the data eye arrives at the receiver latch centered on the DQS transition.

Further, ZQ calibration may be employed before and during operation of the memory device 102 to maintain different parameter values consistent with changes in process, temperature, and voltage (PVT) values. A multi-purpose command (MPC) may be used to initiate ZQ calibration, which calibrates the output driver impedance across process, temperature, and voltage, e.g., based on readings taking at the ZQ resistor 116. In some embodiments, ZQ calibration occurs in the background of device operation and dual channel devices share common ZQ circuitry between channels, which follow a protocol to allow for channel independence.

In some embodiments, there are two ZQ calibration modes initiated with the MPC command: ZQCal Start and ZQCal Latch. The ZQCal Start command can initiate a calibration procedure of the memory device 102 and ZQCal Latch command may capture the result and loads result into drivers of the memory device 102, which may also be stored in memory registers. A ZQCal Start command may be issued anytime the memory device 102 is not in a power-down state. A ZQCal Latch command may be issued anytime outside of power-down after tZQCAL has expired and all DQ bus operations have completed. A command and address (CA) bus can maintain a deselect state during tZQLAT to allow CA on-die termination (ODT) calibration settings to be updated. In some embodiments, the following mode register fields that modify I/O parameters cannot be changed following a ZQCal Start command and before tZQCAL has expired: PU-Cal (pullup calibration VOH point); PDDS (pull down drive strength and RX termination); DQ-ODT (DQ ODT value); and CA-ODT (CA ODT value).

In some embodiments of LVSTL, the DQ bus needs to be terminated, so when the host device 190 reads from the memory device 102, the memory device 102 sends the data on the DQ bus and the host device 190 needs to terminate the bus. In a CA entry, the host device 190 may send the CA on a CS bus (not the same bus as the DQ) and the memory device 102 can terminate the CS bus using ODT circuits on die.

Figure 2:
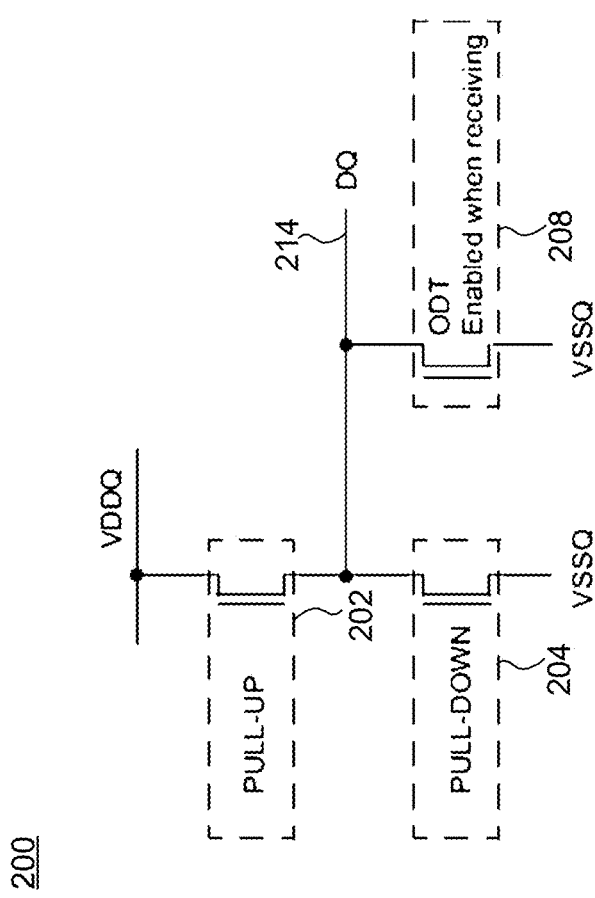
FIG. 2 is a simplified block diagram of a portion of the IO buffer according to some embodiments.

FIG. 2 is a simplified block diagram of a portion 200 of the IO buffer 110 (FIG. 1) according to some embodiments. The portion 200 of the IO buffer 110 includes one or more pullup transistor(s) 202 coupled inline with one or more pulldown transistor(s) 204. An ODT transistor 208 may be coupled to a DQ output line 214 and that is enabled when receiving data. The ODT transistor 208 may be employed to ensure signal integrity, reliable operation, and compatibility with the host device 190. The VOH voltage may be output high voltage generated by resistance dividing between the one or more pullup transistor(s) 202 and the ODT transistor 208.

Figure 3:
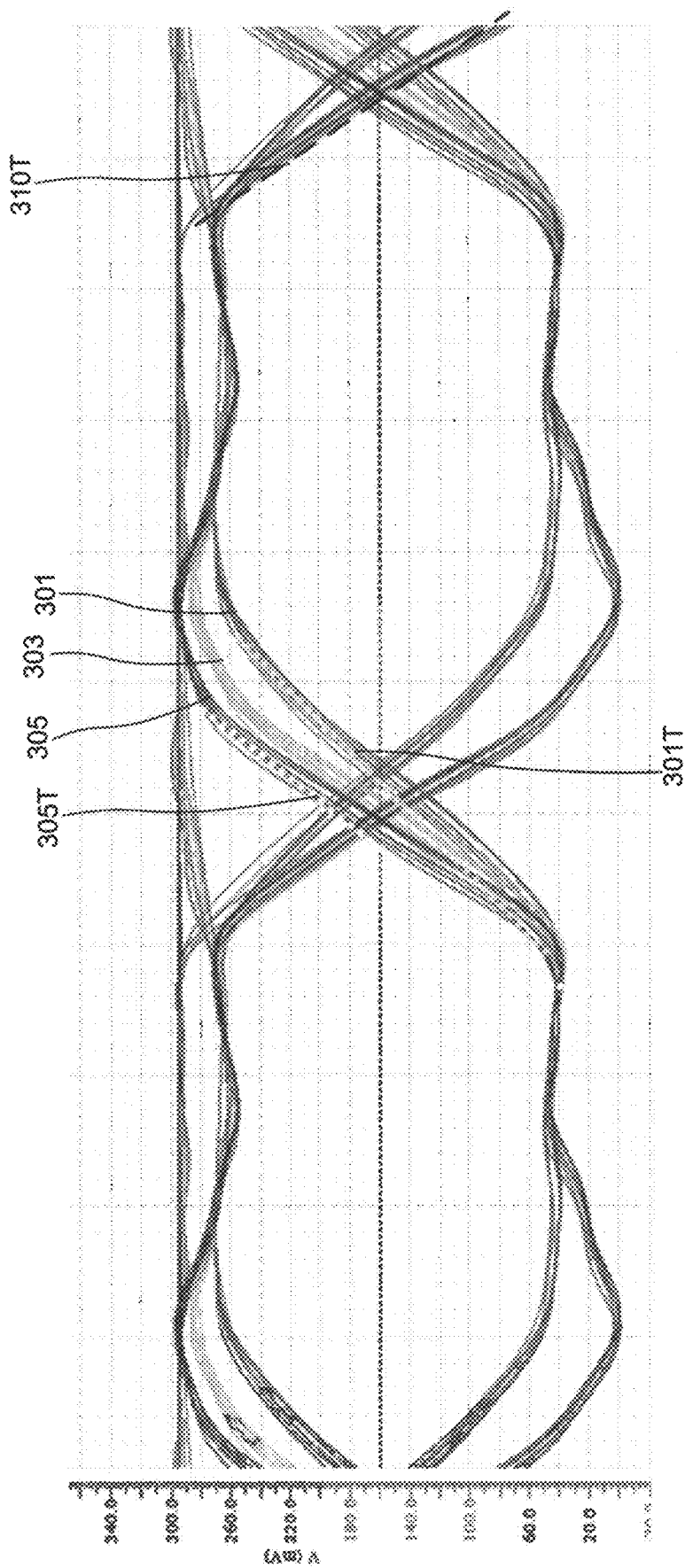
FIG. 3 is a graph illustrating different eye diagrams for comparing no pulse acceleration to employing eight additional pullup transistors to employing 12 additional pullup transistors, according to several embodiments.
Figure 4A:
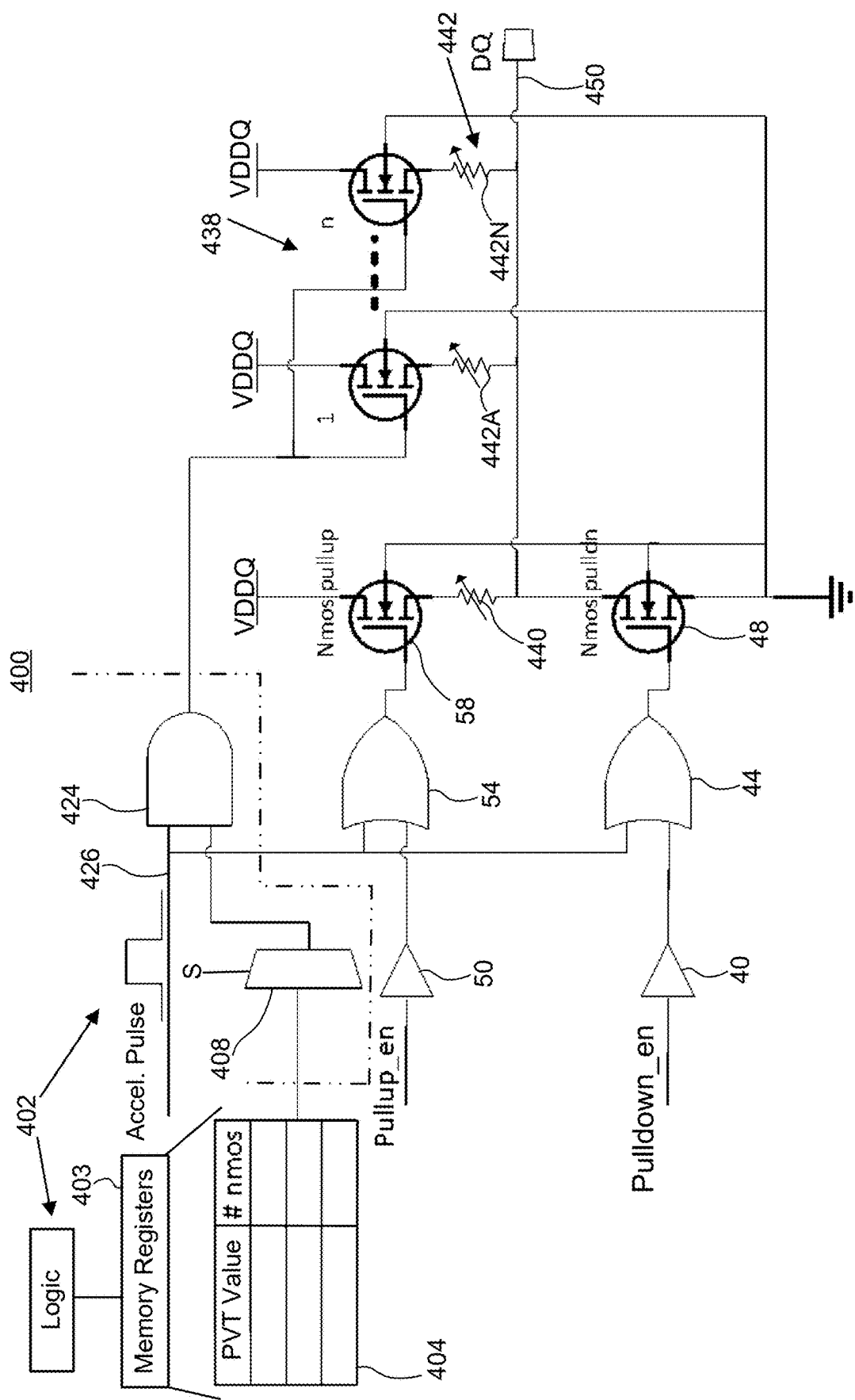
FIG. 4A is a circuit diagram of an IO buffer implemented for selectively adding a customized number of pullup transistors according to some embodiments.

FIG. 3 is a graph illustrating different eye diagrams for comparing no pulse acceleration to employing eight additional pullup transistors to employing 12 additional pullup transistors, according to several embodiments. These eye diagrams are of DQ outputs from the IO buffer 110 such as illustrated in FIG. 2 and FIG. 4A, which is discussed below.

For example, these superimposed eye diagrams include a first eye diagram 301 illustrating a data eye with no acceleration pulse, a second eye diagram 303 illustrating a data eye while employing eight additional pullup transistors (enabled via an acceleration pulse), and a third eye diagram 305 illustrating a data eye while employing 12 additional pullup transistors (enabled via an acceleration pulse.

As can be seen, the slope of a data transient portion 301T of the first eye diagram 301 is smaller than a data transient portion 305T of the third eye diagram 305 and the data transient portion of the second eye diagram 303 is therebetween. Thus, the data eye associated with the third eye diagram 305 is wider and more pronounced compared to the data eye associated with the first eye diagram 301. This helps DQS strobing to better, and more accurately, sample data from the data eye.

In some embodiments, the acceleration pulse may be a pulldown acceleration pulse during a pulldown transient period, illustrated as a pulldown transient period 310T, which comes before each pullup data transient period or portion (e.g., labeled by 301T and 305T). In alternatives of the disclosed embodiments, transistors and/or resistors may be selected to alter the strength of the one or more pulldown transistors 204 (e.g., also as discussed with reference to FIGS. 4A-4B and FIG. 6 below). In this way, the principles of this disclosure may be employed similarly to the pulldown transient portion 310T related to changes to the strength of the pulldown transistors of the IO buffer 110. If the acceleration pulse were to be applied during the pulldown transient period, then each of the second eye diagram 303 and the third eye diagram 305 in the region of the pulldown transient period 310T would be more pronounced, e.g., of an increased slope similar to that of the data transient portion 305T.

FIG. 4A is a circuit diagram of an IO buffer 400 implemented for selectively adding a customized number of pullup transistors according to some embodiments. In embodiments, the IO buffer 400 is at least a portion of the IO buffer 110 of FIG. 1. In embodiments, the IO buffer 400 includes a buffer 40 coupled to an OR gate 44, which is coupled to a pulldown transistor 48. A pulldown enable (pulldown_en) signal may be asserted at the input to the buffer 40 to activate the pulldown transistor 48. In embodiments, the IO buffer 400 includes a buffer 50 coupled to an OR gate 54, which is coupled to a pullup transistor 58. In some embodiments, the pulldown transistor 48 is source-drain-coupled to the pullup transistor 58. A pullup enable (pullup_en) signal may be asserted at the input to the buffer 50 to activate the pullup transistor 58.

In at least some embodiments, the pullup transistor 58 is understood to be a primary pullup transistor, which includes one transistor or a fixed number of multiple pullup transistors, coupled between a power supply and ground and coupled to a data quick (DQ) output line 450. In some embodiments, a variable resistor 440 is coupled inline to a source of the pullup transistor 58. In some embodiments, the pullup transistor 58 is enabled when the IO buffer 400 is transmitting data and has a default size used to maintain a DC value of the VOH.

In at least some embodiments, the IO buffer 400 also includes a plurality of selectable pullup transistors 438 coupled in parallel with the primary pullup transistor, e.g., the pullup transistor 58. In some embodiments, a variable resistor 442A . . . 442N (of a plurality of variable resistors 442) is coupled inline to a source of each selectable pullup transistor of the plurality of selectable pullup transistors 438. In some embodiments, the IO buffer 400 further includes a set of memory registers 403 to store PVT data associated with the memory device 102. In some embodiments, the set of memory registers 403 includes one of hardwired registers or memory cells at reserved addresses within the array of memory cells, e.g., located within the multiple memory banks 115 (FIG. 1). In illustrated embodiments herein, transistors are n-type metal-oxide semiconductor (NMOS) transistors, but in other embodiments, as would be appreciated by one of skill in the art, the illustrated design may be inverted and p-type or PMOS transistors may be employed.

The IO buffer 400 may also include logic 402 coupled to the plurality of selectable pullup transistors 438 and to the plurality of variable resistors 442. In at least some embodiments, the logic 402 selects a customized number of the plurality of selectable pullup transistors 438, based on the PVT data, during a transient period of data transmission at the DQ output line 450. In this way, the overall size of the pullup transistors may be selectively customized to compensate for changes in PVT values associated with the memory device 102. In some embodiments, the selected customized number of the plurality of selectable pullup transistors 438 is based, in part, on a type of the LPDDR memory of the multiple memory banks 115.

In at least some embodiments, the logic 402 further trims, based on the PVT data, a resistance of each variable resistor 442 coupled inline to the selected customized number of the plurality of selectable pullup transistors 438. This trimming may include reducing the resistance to only a line resistance and thus resistance may be added or removed to each selectable pullup transistor whether or not selected to customize a pullup strength of each branch having the selectable pullup transistor.

In some embodiments, the PVT data is a value derived from a ZQ calibration most-recently performed via the ZQ resistor 116 coupled externally to a ZQ pin of the memory device 102. In other embodiments, the PVT data includes most-recently-obtained values from one of the on-board sensors 122, e.g., temperature detectors, voltage detectors, or ring oscillators located on-board the memory device 102.

TABLE 1

| ZQ Value | lpddr4x | | lpddr4 | |
| --- | --- | --- | --- | --- |
| | x0.5 | x0.6 | x0.333 | x0.4 |
| 10 > x | 28 | NA | NA | NA |
| 10 < x < 20 | 36 | 36 | 44 | NA |
| 20 < x < 30 | 36 | 36 | 52 | 52 |
| 30 < x < 40 | 36 | 36 | 52 | 52 |
| 40 < x < 63 | 36 | 36 | — | 64 |
| 63 < x | no pulse | no pulse | no pulse | no pulse |

In at least some embodiments, the logic 402 stores, in a data structure 404 in the set of memory registers 403, a range of PVT values indexed against a number of the plurality of selectable pullup transistors. The logic 402 may further select the customized number of the plurality of selectable pullup transistors 438 based on the PVT data corresponding to the range of PVT values and optionally also based on the type (or mode) of the memory device 102. Table 1 is an example data structure with the ZQ value ranges populated in a first column and indexed against different types of LPDDR-based devices in subsequent columns. As can be observed, sometimes no additional pullup transistors need to be selected and sometimes no acceleration pulse is need to be applied.

In some embodiments, the logic 402 includes a multiplexer 408 having, as inputs, different numbers of the plurality of selectable pullup transistors 438 stored in the data structure 404 and, as a selector, a most-recent value of the PVT data. The logic 402 may further include an AND gate 424 (or other logic gate) having, as inputs, an output of the multiplexer 408 and a line 426 carrying an acceleration pulse that is applied during the transient period. The AND gate 424 (or other logic gate) may further include an output coupled to gates of the plurality of selectable pullup transistors 438, e.g., to enable the number of the plurality of selectable pullup transistors 438 output by the multiplexer 408.

In some embodiments, there may be many data structures stored in the set of memory registers 403, each storing different ranges of PVT values indexed against different numbers of the plurality of selectable pullup transistors 438, e.g., to enable customization if the PVT data is obtained from the on-board sensors 122, for example, or for other process corners. Thus, in some embodiments, the logic 402 stores, in each data structure of a plurality of data structures, a plurality of ranges of PVT values, each indexed against a predetermined number of the plurality of selectable pullup transistors to be selected for a particular process corner.

Only by way of example, Table 2 illustrates a first data structure storing temperature values in a first column and voltage values in a first row, both indexed against different numbers of the plurality of selectable pullup transistors 438 for a typical process corner associated with a typical speed of a data transient at the DQ output line (see data transient portion 301T of FIG. 3).

TABLE 2

| TT | 0.9 | 1 | 1.2 |
|---|---|---|---|
| –45-25 | 12 | 8 | 6 |
| 25-50 | 24 | 12 | 8 |
| 50-75 | 48 | 24 | 12 |
| 75-100 | 63 | 48 | 24 |
| 100-125 | 63 | 63 | 48 |
| 125-150 | 63 | 63 | 63 |

Table 3 illustrates a second data structure storing temperature values in a first column and voltage values in a first row, both indexed against different numbers of the plurality of selectable pullup transistors 438 for a fast process corner (FF) associated with a fast speed of a data transient at the DQ output line, e.g., faster than the typical speed.

TABLE 3

| FF | 0.9 | 1 | 1.2 |
|---|---|---|---|
| –45-25 | 8 | 4 | 2 |
| 25-50 | 20 | 8 | 4 |
| 50-75 | 44 | 20 | 8 |
| 75-100 | 59 | 44 | 20 |
| 100-125 | 59 | 59 | 44 |
| 125-150 | 59 | 59 | 59 |

Table 4 illustrates a third data structure storing temperature values in a first column and voltage values in a first row, both indexed against different numbers of the plurality of selectable pullup transistors 438 for a slow process corner (SS) associated with a slow speed of a data transient at the DQ output line, e.g., slower than the typical speed.

TABLE 4

| SS | 0.9 | 1 | 1.2 |
|---|---|---|---|
| –45-25 | 16 | 12 | 10 |
| 25-50 | 28 | 16 | 12 |
| 50-75 | 52 | 28 | 16 |
| 75-100 | 63 | 52 | 28 |
| 100-125 | 63 | 63 | 52 |
| 125-150 | 63 | 63 | 63 |

While only three tables are illustrated here for three exemplary process corners (TT, FF, SS), there are envisioned many additional PVT-related tables for additional process corners. For example, the number of process corners depends on the foundry process, e.g., and can result in two kinds of slow and fast corners (slow and slowest, fast and fastest) for both NMOS and PMOS devices and then based on resistor corners (e.g., SS NMOS, SS PMOS, SS resistor; SS NMOS, SS PMOS, typical resistor; or SS NMOS, FF PMOS, typical resistor; and so forth). These additional process corners add in additional permutations of corresponding PVT value ranges and thus also assigned number of pullup transistors and/or variable resistors.

Thus, in at least some embodiments, the logic 402 stores, in the first data structure, a plurality of ranges of PVT values each indexed against a first number of the plurality of selectable pullup transistors 438 to be selected for a typical process corner associate with a typical speed of a data transient at the DQ output line. The logic 402 may further store, in a second data structure, the plurality of ranges of PVT values each indexed against a second number of the plurality of selectable pullup transistors 438 to be selected for a fast process corner associated with a speed of the data transient that is faster than the typical speed. The logic 402 may further store, in a third data structure, the plurality of ranges of PVT values each indexed against a third number of the plurality of selectable pullup transistors 438 to be selected for a slow process corner associated with a speed of the data transient that is slower than the typical speed. The logic 402 may further select one of the first number, the second number, or the third number of the plurality of selectable pullup transistors 438 based on the PVT data corresponding to a range of the plurality of ranges of PVT values and on a speed of the data transient. As discussed, these process corners may be multiplied across many more than three possible process corners, and thus these are only exemplary.

Figure 4B:
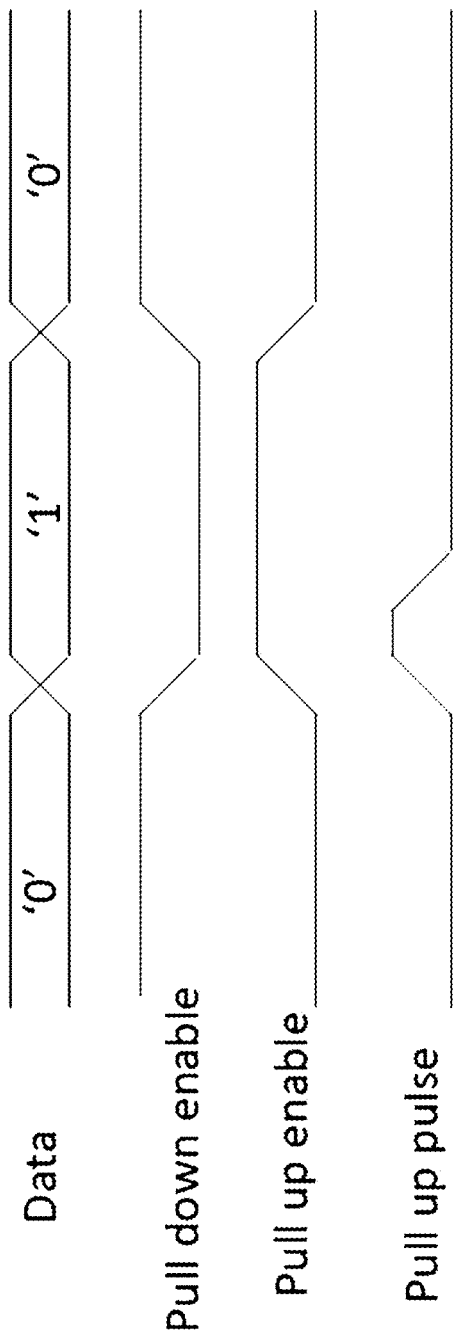
FIG. 4B is a plot illustrating transitional timing, within the IO buffer, during which an acceleration pulse is employed according to some embodiments.

FIG. 4B is a plot illustrating transitional timing, within the IO buffer 400, during which an acceleration (or pullup) pulse is employed according to some embodiments. As illustrated, in some embodiments, the pullup or acceleration pulse is activated at a beginning of a data transition between bits, e.g., during a transition from a zero bit value to a one bit value. In embodiments, this is the data transition period during which the additional pullup transitions may help strengthen and widen the data eye, as was discussed with reference to FIG. 3.

Figure 5:
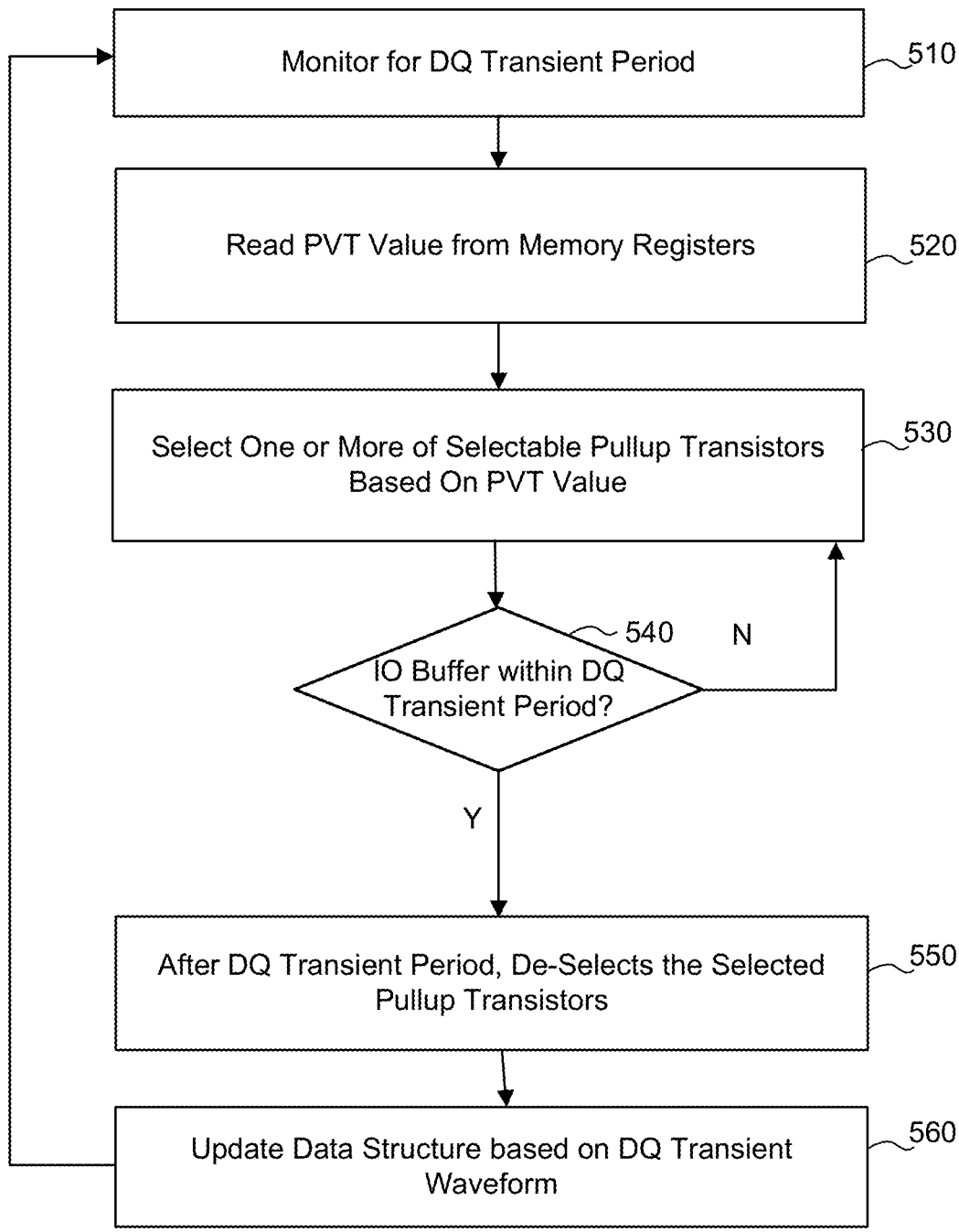
FIG. 5 is a flow chart of a method for calibrating the effective pullup transistor size depending on PVT data according to some embodiments associated with FIG. 4A.

FIG. 5 is a flow chart of a method 500 for calibrating the effective pullup transistor size depending on PVT data according to some embodiments associated with FIG. 4A. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the logic 402 of the IO buffer 400 of FIG. 4A.

Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing logic monitors for a DQ transient period, e.g., at bit transitions in data being transferred through the IO buffer 400.

At operation 520, the processing logic reads a PVT value from the set of memory registers 403, e.g., a most-recently stored PVT value.

At operation 530, the processing logic selects one or more of the plurality of selectable pullup transistors 438 based on the PVT value.

At operation 540, the processing logic determines whether the IO buffer 400 is within the DQ transient period. In some embodiments, the processing logic detects the pullup or acceleration pulse, and thus knows the IO buffer is within the DQ transient period. If no, at operation 540, the processing logic loops back to operation 530 and continues to wait to enter the data transient period, but already knows how many of the selectable pullup transistors to select. If yes at operation 540, the processing logic transitions through the transient period with the selected pullup transistors of the plurality of selectable pullup transistors 438.

At operation 550, the processing logic, after the DQ transient period, deselects the selected pullup transistors, e.g., so that the extra pullup transistors need not be employed after the DQ transient period to maintain the VOH DC level.

At operation 560, the processing logic updates the data structure 404 based on the DQ transient waveform, e.g., a slope steepness. The updates to the data structure 404 may further calibrate the range of PVT values indexed against a particular number of the plurality of selectable pullup transistors, which can then statically be applied during real-time operation.

After completing data transfer and updating the data structure 404, the method 500 may loop back to operation 510 to continue monitoring for the next DQ transient period and perform continued calibration of the IO buffer. As discussed previously, the method 500 may also be applied to a pulldown transient period in selecting from a bank of a plurality of selectable pulldown transistors, and thus be performed directly after the above-described operations once the IO buffer transitions into the pulldown transient period.

Figure 6:
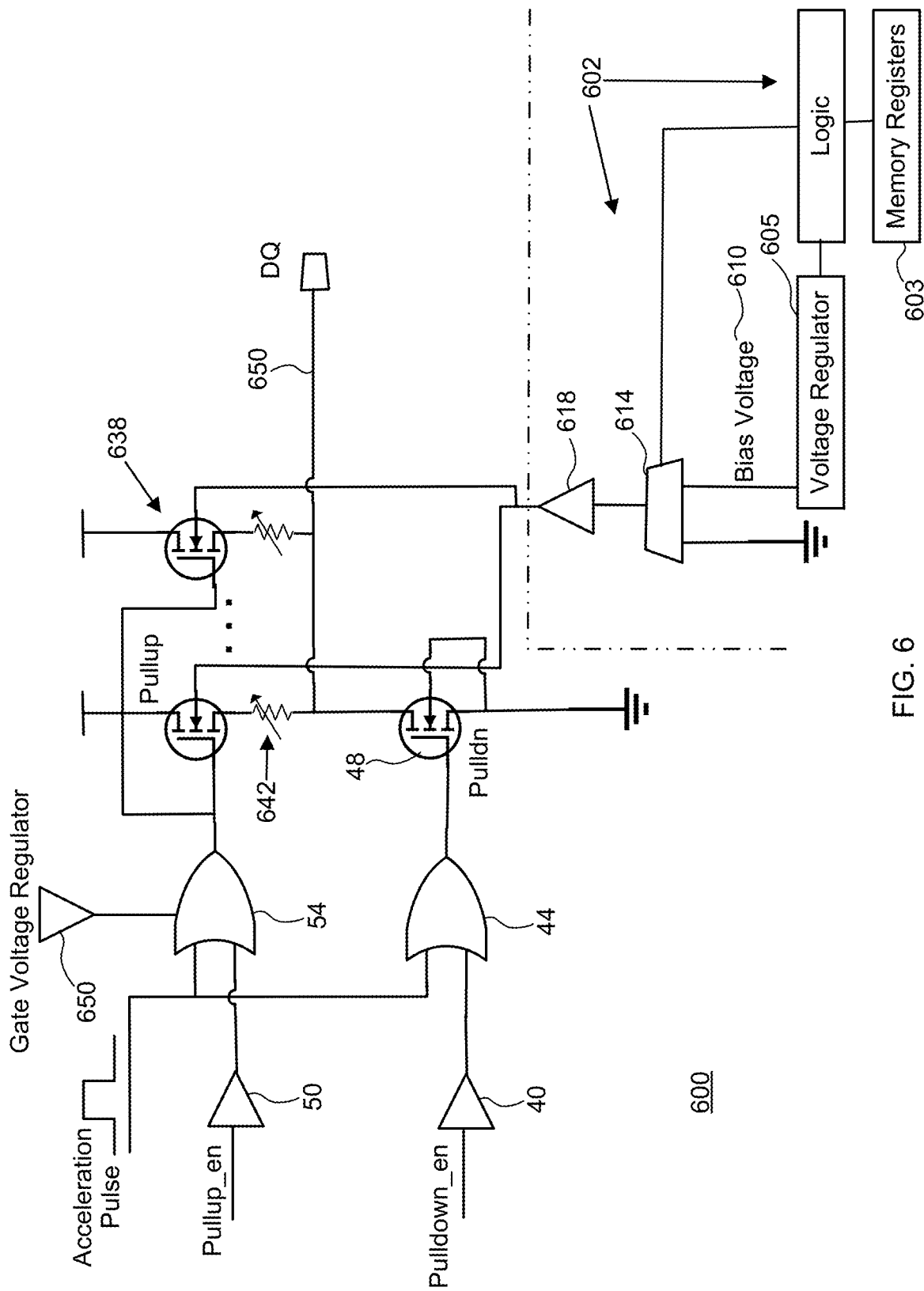
FIG. 6 is a circuit diagram of an IO buffer implemented for selectively adding a particular voltage bias to a substrate of the pullup transistors according to other embodiments.

FIG. 6 is a circuit diagram of an IO buffer 600 implemented for selectively adding a particular voltage bias 610 to a substrate of the pullup transistors according to other embodiments. In embodiments, the IO buffer 600 is at least a portion of the IO buffer 110 of FIG. 1. In embodiments, the IO buffer 600 includes a buffer 40 coupled to an OR gate 44 (or other logic gate), which is coupled to a pulldown transistor 48. A pulldown enable (pulldown_en) signal may be asserted at the input to the buffer 40 to activate the pulldown transistor 48. In embodiments, the IO buffer 600 includes a buffer 50 coupled to an OR gate 54 (or other logic gate), which is coupled to a bank of pullup transistors 638, e.g., multiple pullup transistors coupled in parallel.

In embodiments, the bank of pullup transistors 638 is coupled between a power supply and ground and coupled to a data quick (DQ) output line 650. In some embodiments, the pulldown transistor 48 is source-drain-coupled to the bank of pullup transistor 638. A pullup enable (pullup_en) signal may be asserted at the input to the buffer 50 to activate the bank of pullup transistors 638. In some embodiments, the IO buffer 600 includes a plurality of variable resistors 642, each coupled inline to a source of a respective pullup transistor of the bank of pullup transistors 638.

In at least some embodiments, the IO buffer 600 includes a set of memory registers 603 to store process, voltage, temperature (PVT) data associated with the memory device. In some embodiments, the set of memory registers 403 includes one of hardwired registers or memory cells at reserved addresses within the array of memory cells, e.g., located within the multiple memory banks 115 (FIG. 1).

In some embodiments, the IO buffer 600 further includes a voltage regulator 605 to generate the bias voltage 610. The IO buffer 600 may further include logic 602 coupled to the bank of pullup transistors 638, the plurality of variable resistors 642, and the voltage regulator 605. In some embodiments, the logic 602 to selectively apply the bias voltage 610 to a substrate of the bank of pullup transistors 638, based on the PVT data, during a transient period of data transmission at the DQ output line 650. For example, the logic 602 may set the bias voltage of the voltage regulator 605 based on a present value of the PVT data. The bias voltage 610 may effectively change the threshold voltages of the transistors within the bank of pullup transistors 638, which similar to the embodiment of FIG. 4A, achieves a same result of customizing a strength of the pullup transistors, but via altering threshold voltages of a fixed number of transistors.

In some embodiments, the logic 602 includes a multiplexer 614 to be switched between passing a ground voltage and passing the bias voltage 610. The logic 602 may further include a buffer 618 coupled between the multiplexer 614 and the bank of pullup transistors 638. In some embodiments, the logic 602 determines a PVT value of the PVT data fails to satisfy a threshold value, and to selectively apply the bias voltage 610, the logic 602 applies a positive bias voltage that causes a decrease in threshold voltage of pullup transistors within the bank of pullup transistors. Additional functionality of the logic 602 is discussed with reference to FIG. 7.

In at least some embodiments, the logic 602 further trims, based on the PVT data, a resistance of each variable resistor 642 coupled inline to the selected pullup transistors of the bank of selectable pullup transistors 638. This trimming may include reducing the resistance to only a line resistance and thus resistance may be added or removed to each selectable pullup transistor whether or not selected to customize a pullup strength of each branch having the selectable pullup transistor.

In some embodiments, the logic 602 includes a gate voltage regulator 645 (which may also be the voltage regulator 605 in some embodiments) to generate a regulated gate voltage. For example, along with applying the bias voltage 610 to the bank of pullup transistors 638, the logic 602 may cause the gate voltage regulator 645 to adjust the gate voltage of the pullup transistors of the bank of pullup transistors 638. In some embodiments, for example, the regulated gate voltage may be a reduced gate voltage that facilitates the selection of additional pullup transistors from the bank of pullup transistors 638. The ability to select additional pullup transistors may provide additional headroom to strengthen the pullup voltage of all of the coupled pullup transistors during a data transient period.

Figure 7:
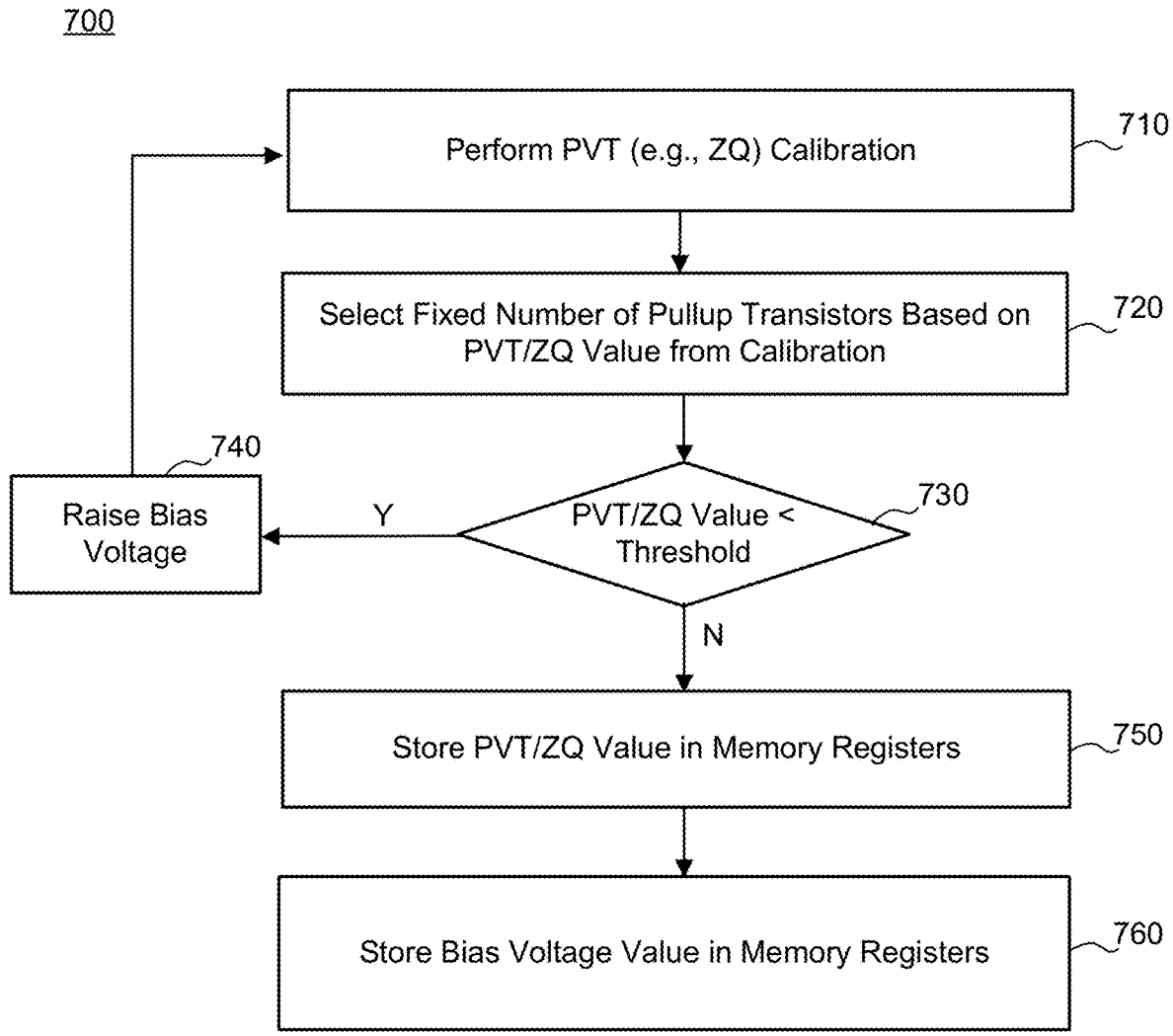
FIG. 7 is a flow chart of a method for dynamically varying the effective pullup transistor size depending on PVT data according to other embodiments according with FIG. 6.

FIG. 7 is a flow chart of a method 700 for dynamically varying the effective pullup transistor size depending on PVT data according to other embodiments according with FIG. 6. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the logic 602 of the IO buffer 600 of FIG. 6. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 710, the processing logic performs PVT-based calibration, such as ZQ calibration, which was discussed in detail previously.

At operation 720, the processing logic selects a fixed number of pullup transistors (e.g., of the bank of pullup transistors 638) based on the PVT/ZQ value from ZQ calibration (or from reading the sensors 122 (FIG. 1)) and before selectively applying the bias voltage.

At operation 730, the processing logic determines whether the PVT or ZQ value is less than a threshold value, e.g., fails to satisfy a threshold value. If the threshold value is not satisfied, at operation 740, the processing logic raises the bias voltage 610 as was discussed with reference to FIG. 6. Then, the method 700 may loop back through operations 710 and 720, e.g., by causing, after applying the bias voltage, the ZQ calibration to be rerun to generate a new ZQ value and selecting an updated fixed number of transistors, from the bank of pullup transistors 638, based on the new ZQ value. This second time through operations 710 and 720 may be performed at least one time.

If, at operation 740, the PVT or ZQ value does satisfy the threshold value, e.g., exceeds the threshold value, the processing logic may perform operations 750 and 760.

At operation 750, the processing logic stores the PVT or ZQ value in the memory registers.

At operation 760, the processing logic stores the bias voltage value in the memory registers 603. The processing logic may then employ the stored PVT/ZQ value and the bias voltage corresponding to the stored bias voltage value to bias the bank of pullup transistors 638 during operation of the IO buffer 600.

In some embodiments, the processing device may further determine, via simulation or characterization of operation of the bank of pullup transistors on a data transient during the transient period, that the updated fixed number of transistors provides an insufficient bulk transistor threshold voltage to achieve a predetermined slope of the data transient. In this situation, processing device may further one of reduce or eliminate the bias voltage applied to the substrate of the bank of transistors.

Figure 8:
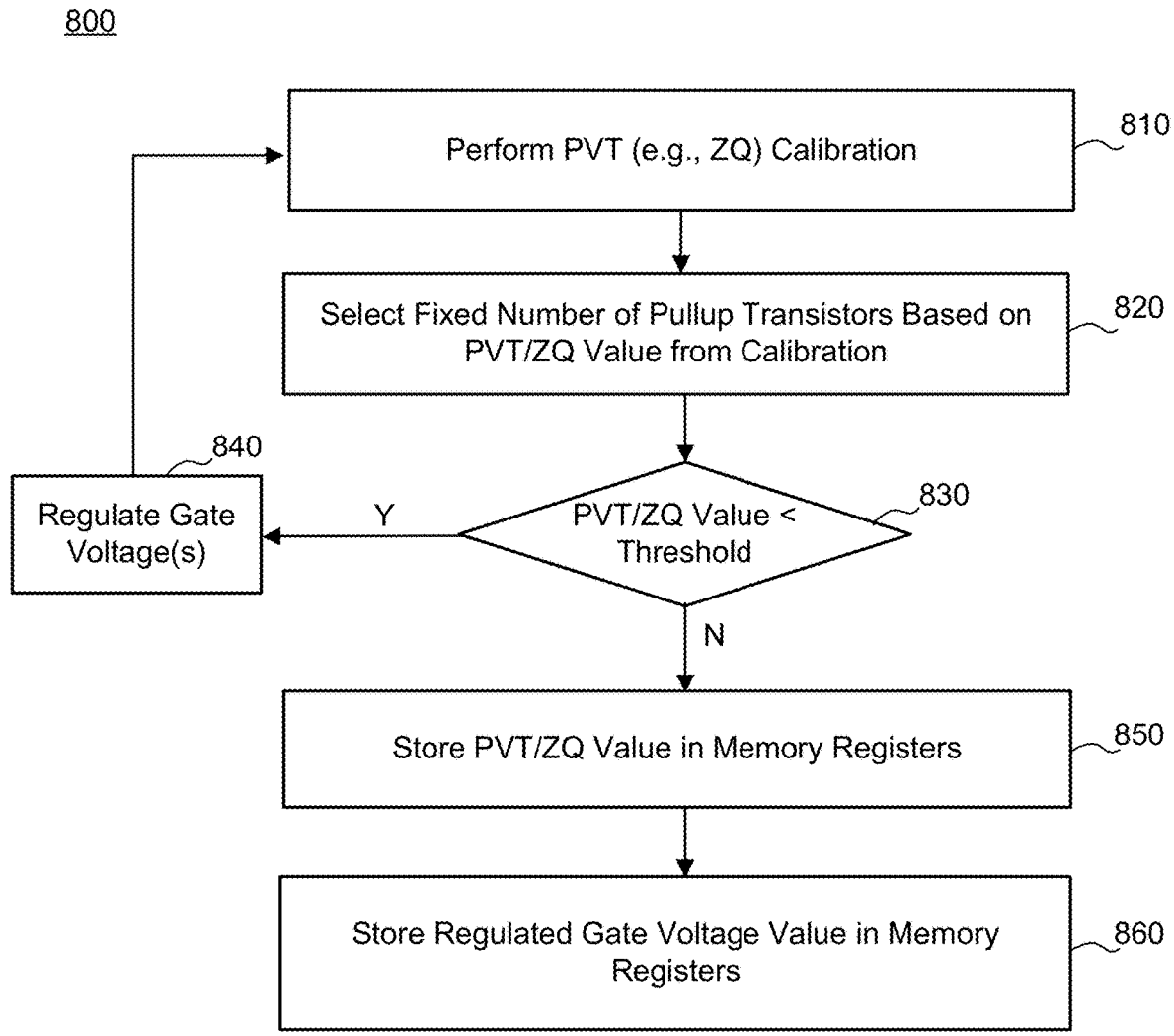
FIG. 8 is a flow chart of a method for dynamically varying the effective pullup transistor strength depending on PVT data according to other embodiments according with FIG. 6.

FIG. 8 is a flow chart of a method 800 for dynamically varying the effective pullup transistor strength depending on PVT data according to other embodiments according with FIG. 6. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the logic 602 of the IO buffer 600 of FIG. 6. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 810, the processing logic performs PVT-based calibration, such as ZQ calibration, which was discussed in detail previously.

At operation 820, the processing logic selects a fixed number of pullup transistors (e.g., of the bank of pullup transistors 638) based on the PVT/ZQ value from ZQ calibration (or from reading the sensors 122 (FIG. 1)) and before selectively applying the bias voltage.

At operation 830, the processing logic determines whether the PVT or ZQ value is less than a threshold value, e.g., fails to satisfy a threshold value. If the threshold value is not satisfied, at operation 840, the processing logic regulates the gate voltage of the bank of pullup transistors 638 as was discussed with reference to FIG. 6. Then, the method 800 may loop back through operations 810 and 820, e.g., by causing, after regulating the gate voltage, the ZQ calibration to be rerun to generate a new ZQ value and selecting an updated fixed number of transistors, from the bank of pullup transistors 638, based on the new ZQ value. This second time through operations 810 and 820 may be performed at least one time. In this way, the processing logic also adjusts the selected fixed number of transistors of the bank of pullup transistors 638 based on the regulated gate voltage.

If, at operation 840, the PVT or ZQ value does satisfy the threshold value, e.g., exceeds the threshold value, the processing logic may perform operations 850 and 860.

At operation 850, the processing logic stores the PVT or ZQ value in the memory registers.

At operation 860, the processing logic stores the regulated gate voltage value in the memory registers 603. The processing logic may then employ the stored PVT/ZQ value and regulate the gate voltage corresponding to the stored regulated gate voltage value to update the effective strength of the bank of pullup transistors 638 during operation of the IO buffer 600.

In some embodiments, the processing device may further determine, via simulation or characterization of operation of the bank of pullup transistors on a data transient during the transient period, that the updated fixed number of transistors provides an insufficient bulk transistor threshold voltage to achieve a predetermined slope of the data transient. In this situation, processing device may further one of reduce or eliminate the bias voltage applied to the substrate of the bank of transistors.

Figure 9:
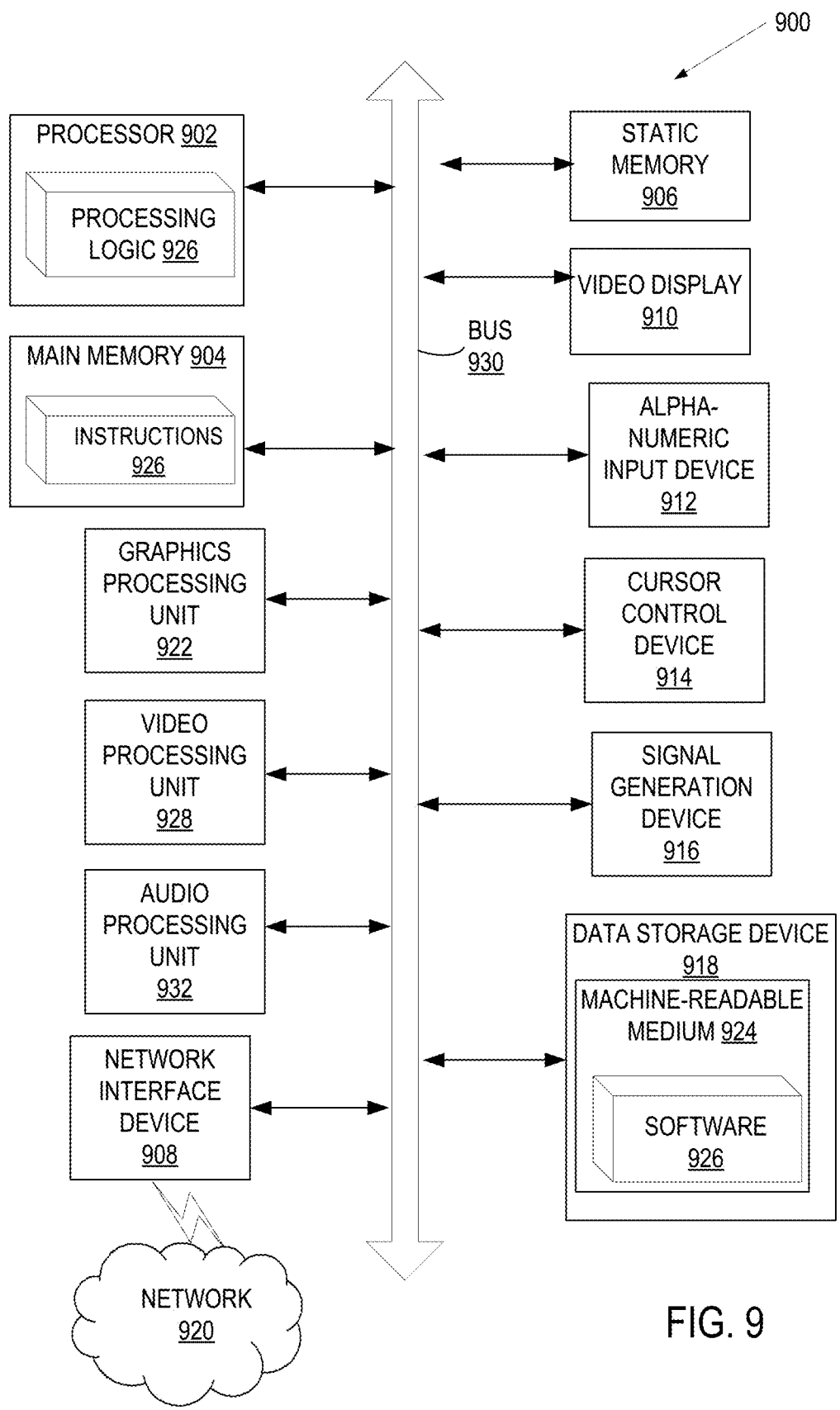
FIG. 9 illustrates a diagrammatic representation of a machine in the example form of a computing system within which a set of instructions, for causing the machine to perform any one or more of the methodologies discussed herein, may be executed.

FIG. 9 illustrates a diagrammatic representation of a machine in the example form of a computing system 900 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a host computing system or computer, an automotive computing device, a server, a network device for an automobile network such as a controller area network (CAN) or local interconnected network (LIN), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 900.

The computing system 900 includes a processing device 902, main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor device, central processing unit, or the like processing device. More particularly, the processing device may be complex instruction set computing (CISC) microprocessor device, reduced instruction set computer (RISC) microprocessor device, very long instruction word (VLIW) microprocessor device, or processing device implementing other instruction sets, or processing devices implementing a combination of instruction sets. Processing device 902 may also be one or more special-purpose processing devices such as an application specific integrated circuit (ASIC), a field programmable gate array (FPGA), a digital signal processing device (DSP), network processing device, or the like. In one implementation, processing device 902 may include one or more processing device cores. The processing device 902 is configured to execute instructions 926 for performing the operations discussed herein. In one implementation, processing device 902 may be part of the system 100 of FIG. 1.

Alternatively, the computing system 900 may include other components as described herein. The computing system 900 may further include a network interface device 908 communicably coupled to a network 920. The computing system 900 also may include a video display unit 910 (e.g., a liquid crystal display (LCD)), an alphanumeric input device 912 (e.g., a keyboard), a cursor control device 914 (e.g., a mouse), a signal generation device 916 (e.g., a speaker), or other peripheral devices. Furthermore, computing system 900 may include a graphics processing unit 922, a video processing unit 928 and an audio processing unit 932. In another implementation, the computing system 900 may include a chipset (not illustrated), which refers to a group of integrated circuits, or chips, which are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI, or ISA buses.

The data storage device 918 may include a computer-readable storage medium 924 on which is stored instructions 926 embodying any one or more of the methodologies of functions described herein. The instructions 926 may also reside, completely or at least partially, within the main memory 904 as instructions 926 and/or within the processing device 902 as processing logic during execution thereof by the computing system 900; the main memory 904 and the processing device 902 also constituting computer-readable storage media.

The computer-readable storage medium 924 may also be used to store instructions 926 utilizing the processing device 902, such as described with respect to FIG. 1, and/or a software library containing methods that call the above applications. While the computer-readable storage medium 924 is shown in an example implementation to be a single medium, the term "computer-readable storage medium" should be taken to include a single medium or multiple media (e.g., a centralized or distributed database, and/or associated caches and servers) that store the one or more sets of instructions. The term "non-transitory, computer-readable storage medium" shall also be taken to include any medium that is capable of storing, encoding or carrying a set of instructions for execution by the machine and that cause the machine to perform any one or more of the methodologies of the implementations. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, NVMs, read-only memories (ROMs), random access memories (RAMs), EPROMS, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electromagnetic media, any medium that is capable of storing a set of instructions for execution by hardware and that causes the hardware to perform any one or more of the methodologies of the present embodiments.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A memory device comprising:
an array of memory cells of non-volatile memory; and
an input/output (IO) buffer coupled to the array, wherein the IO buffer comprises:
a primary pullup transistor coupled between a power supply and ground and coupled to a data quick (DQ) output line;
a plurality of selectable pullup transistors coupled in parallel with the primary pullup transistor; and
logic coupled to the plurality of selectable pullup transistors, the logic to select a customized number of the plurality of selectable pullup transistors, based on process, voltage, temperature (PVT) data associated with the memory device, for use during a transient period of data transmission at the DQ output line.

2. The memory device of claim 1, wherein the IO buffer comprises a low power double data rate (LPDDR)-based interface, and wherein the selected customized number of the plurality of selectable pullup transistors is based, in part, on a type of the LPDDR-based interface.

3. The memory device of claim 1, further comprising a set of memory registers coupled to the IO buffer and to store the PVT data, wherein the primary pullup transistor comprises a fixed number of multiple pullup transistors.

4. The memory device of claim 1, wherein the IO buffer further comprises a plurality of variable resistors, each coupled inline to a source of a respective pullup transistor of the plurality of selectable pullup transistors, and wherein the logic is further to trim, based on the PVT data, a resistance of each variable resistor coupled to the selected customized number of the plurality of selectable pullup transistors.

5. The memory device of claim 1, wherein the PVT data comprises one of:
a value derived from a ZQ calibration most-recently performed via a ZQ resistor coupled externally to a ZQ pin of the memory device; or
most-recently-obtained values from one of temperature detectors, voltage detectors, or ring oscillators located on-board the memory device.

6. The memory device of claim 1, wherein the logic is further to:
store, in a data structure in a set of memory registers, a range of PVT values indexed against a number of the plurality of selectable pullup transistors; and
select the customized number of the plurality of selectable pullup transistors based on the PVT data corresponding to the range of PVT values.

7. The memory device of claim 6, wherein the logic comprises:
a multiplexer comprising, as inputs, different numbers of the plurality of selectable pullup transistors stored in the data structure and, as a selector, a most-recent value of the PVT data; and
a logic gate comprising, as inputs, an output of the multiplexer and a line carrying an acceleration pulse that is applied during the transient period, and comprising an output coupled to gates of the plurality of selectable pullup transistors.

8. The memory device of claim 1, wherein the logic is further to store, in each data structure of a plurality of data structures, a plurality of ranges of PVT values, each indexed against a predetermined number of the plurality of selectable pullup transistors that are to be selected for a particular process corner.

9. A system comprising:
a non-volatile memory device comprising:
an array of memory cells; and
an input/output (IO) buffer coupled to the array, wherein the IO buffer comprises:
a primary pullup transistor coupled between a power supply and ground and coupled to a data quick (DQ) output line;
a plurality of selectable pullup transistors coupled in parallel with the primary pullup transistor; and
logic, coupled to the plurality of selectable pullup transistors, to select a customized number of the plurality of selectable pullup transistors, based on process, voltage, temperature (PVT) data associated with the memory device, for use during a transient period of data transmission at the DQ output line; and
a host device operatively coupled to the memory device, the host device to retrieve data from the array via the IO buffer.

10. The system of claim 9, wherein the IO buffer comprises a low power double data rate (LPDDR)-based interface, and wherein the selected customized number of the plurality of selectable pullup transistors is based, in part, on a type of the LPDDR-based interface.

11. The system of claim 9, further comprising a set of memory registers coupled to the IO buffer and to store the PVT data, wherein the primary pullup transistor comprises a fixed number of multiple pullup transistors.

12. The system of claim 9, wherein the IO buffer further comprises a plurality of variable resistors, each coupled inline to a source of a respective pullup transistor of the plurality of selectable pullup transistors, and wherein the logic is further to trim, based on the PVT data, a resistance of each variable resistor coupled to the selected customized number of the plurality of selectable pullup transistors.

13. The system of claim 9, wherein the PVT data comprises one of:
a value derived from a ZQ calibration most-recently performed via a ZQ resistor coupled externally to a ZQ pin of the memory device; or
most-recently-obtained values from one of temperature detectors, voltage detectors, or ring oscillators located on-board the memory device.

14. The system of claim 9, wherein the logic is further to:
store, in a data structure in a set of memory registers, a range of PVT values indexed against a number of the plurality of selectable pullup transistors; and
select the customized number of the plurality of selectable pullup transistors based on the PVT data corresponding to the range of PVT values.

15. The system of claim 14, wherein the logic comprises:
a multiplexer comprising, as inputs, different numbers of the plurality of selectable pullup transistors stored in the data structure and, as a selector, a most-recent value of the PVT data; and
a logic gate comprising, as inputs, an output of the multiplexer and a line carrying an acceleration pulse that is applied during the transient period, and comprising an output coupled to gates of the plurality of selectable pullup transistors.

16. The system of claim 9, wherein the logic is further to store, in each data structure of a plurality of data structures, a plurality of ranges of PVT values, each indexed against a predetermined number of the plurality of selectable pullup transistors that are to be selected for a particular process corner.

17. A memory device comprising:
an array of memory cells of a non-volatile memory; and
an input/output (IO) buffer coupled to the array, wherein the IO buffer comprises:
a bank of pullup transistors coupled between a power supply and ground and coupled to a data quick (DQ) output line;
a voltage regulator to generate a bias voltage; and
logic coupled to the bank of pullup transistors and the voltage regulator, the logic to selectively apply the bias voltage to a substrate of the bank of pullup transistors, based on process, voltage, temperature (PVT) data associated with the memory device, for use during a transient period of data transmission at the DQ output line.

18. The memory device of claim 17, wherein the IO buffer comprises a low power double data rate (LPDDR)-based interface, further comprising a set of memory registers coupled to the IO buffer and to store the PVT data.

19. The memory device of claim 17, wherein the logic is further to set the bias voltage of the voltage regulator based on a present value of the PVT data.

20. The memory device of claim 17, wherein the logic is further to:
determine a PVT value of the PVT data fails to satisfy a threshold value; and
wherein to selectively apply the bias voltage, the logic is to apply a positive bias voltage that causes a decrease in threshold voltage of pullup transistors within the bank of pullup transistors.

21. The memory device of claim 17, wherein the IO buffer further comprises a plurality of variable resistors, each coupled inline to a source of a respective pullup transistor of the bank of pullup transistors, and wherein the logic is further to trim, based on the PVT data, a resistance of each variable resistor.

22. The memory device of claim 17, wherein the PVT data is a ZQ value derived from a ZQ calibration most-recently performed via a ZQ resistor coupled externally to a ZQ pin of the memory device, and wherein the logic is further to:
select a fixed number of transistors, from the bank of pullup transistors, based on the ZQ value before selectively applying the bias voltage;
cause, after applying the bias voltage, the ZQ calibration to be rerun to generate a new ZQ value; and
select an updated fixed number of transistors, from the bank of pullup transistors, based on the new ZQ value.

23. The memory device of claim 22, wherein the logic is further to:
determine, via simulation or characterization of operation of the bank of pullup transistors on a data transient during the transient period, that the updated fixed number of transistors provides an insufficient bulk transistor threshold voltage to achieve a predetermined slope of the data transient; and
one of reduce or eliminate the bias voltage applied to the substrate of the bank of transistors.

24. The memory device of claim 22, wherein the logic is further to store a value of the bias voltage and the new ZQ value to a set of memory registers included in or coupled to the IO buffer.

25. The memory device of claim 22, wherein the logic is further to:
regulate a gate voltage of the bank of pullup transistors based on the ZQ value; and
adjust the selected fixed number of transistors of the bank of pullup transistors based on the regulated gate voltage.

* * * * *